United States Patent
Kinoshita et al.

(10) Patent No.: US 6,362,443 B1
(45) Date of Patent: Mar. 26, 2002

(54) METHOD OF STORING PRODUCTS AND STORAGE SYSTEM

(75) Inventors: Kazuhide Kinoshita, Higashimurayama; Osamu Fukaura, Oume, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/585,291

(22) Filed: Jun. 2, 2000

(30) Foreign Application Priority Data

Jun. 7, 1999 (JP) .......................................... 11-159737
Jul. 19, 1999 (JP) .......................................... 11-204722

(51) Int. Cl.[7] ............................. B65H 1/00; B07C 5/344
(52) U.S. Cl. .................... 209/574; 209/583; 414/222.01
(58) Field of Search ................................ 209/576, 577, 209/583, 587, 933, 619; 414/908, 792.9, 222.01

(56) References Cited

U.S. PATENT DOCUMENTS

| | | | | |
|---|---|---|---|---|
| 3,743,090 A | * | 7/1973 | Brown et al. ................... | 209/74 |
| 3,895,716 A | * | 7/1975 | Ugo ............................. | 209/74 |
| 4,268,219 A | * | 5/1981 | Nakagawa et al. ........... | 414/786 |
| RE31,294 E | * | 6/1983 | Marosan ....................... | 156/396 |
| 4,723,884 A | * | 2/1988 | Brinker et al. ............... | 414/120 |
| 4,773,810 A | * | 9/1988 | Nishimura et al. ........... | 414/331 |
| 4,820,101 A | * | 4/1989 | Fenn ............................ | 414/21 |
| 4,824,349 A | * | 4/1989 | Oku et al. .................... | 425/29 |
| 4,829,749 A | * | 5/1989 | Hiyama et al. ................ | 53/538 |
| 4,836,386 A | * | 6/1989 | Smith .......................... | 209/564 |
| 4,993,906 A | * | 2/1991 | Nisimura et al. ............. | 414/286 |
| 5,631,028 A | * | 5/1997 | Mizokawa et al. .......... | 425/28.1 |
| 5,880,443 A | * | 3/1999 | McDonald et al. .......... | 235/375 |
| 5,908,283 A | * | 6/1999 | Huang et al. ................ | 414/801 |
| 5,928,675 A | * | 7/1999 | Irie ............................. | 425/34.1 |
| 5,953,234 A | * | 9/1999 | Singer et al. ................. | 364/47 |

FOREIGN PATENT DOCUMENTS

| | | | |
|---|---|---|---|
| JP | 61235319 A | * | 10/1986 |
| JP | 03088603 A | * | 4/1991 |
| JP | 10185766 A | * | 7/1998 |

* cited by examiner

*Primary Examiner*—Donald P. Walsh
*Assistant Examiner*—Joseph C Rodriguez
(74) *Attorney, Agent, or Firm*—Sughrue Mion, PLLC

(57) ABSTRACT

A product storage method is carried out by a product storage system comprising an intermediate storage yard, a product moving means capable of holding a product, of moving vertically, laterally and longitudinally and of placing the product at any place in the intermediate storage yard, a first conveying means for conveying products to the intermediate storage yard, a second conveying means for conveying the products out of the intermediate storage yard, and a control means for controlling the product moving means, the first conveying means and the second conveying means. The control means identifies the type of a product conveyed to the intermediate storage yard by the first conveying means and decides whether or not the product is to be sent to a terminal position, the tire moving means transfers the tire be sent to the terminal position to the second conveying means, the second conveying means carries the same product to the terminal position, and the product moving means carries products other than those to be sent to the terminal position to any places in the intermediate storage yard to store the products in groups of types at the places.

7 Claims, 8 Drawing Sheets

METHOD OF STORING PRODUCTS AND STORAGE SYSTEM

BACKGROUND OF THE INVENTION

1. Field of the Invention

The present invention relates to a product storing method that stores products (end products or intermediate products) in sorted groups in a storage yard, and a storage system.

2. Description of the Related Art

A product storing method sorts received products into groups at the entrance of a storage yard where a plurality of storage conveyors, i.e., storage devices, assigned to the groups of the products are installed in a parallel arrangement, and stores the sorted products on the storage conveyors assigned to the groups of the products, respectively. Upon the coincidence of the number of the products stored on the storage conveyor with a predetermined number, the products are stacked on a pallet and the pallet loaded with the products is carried out of the storage yard.

Suppose that the products are tires. The tires manufactured by a tire manufacturing process are subjected to uniformity inspection on a uniformity inspecting machine. The uniformity inspecting machine uses a rim of a type specially for inspecting tires of a specified type to be inspected. Therefore, the rim must be changed when inspecting tires a different type. In a conventional uniformity inspecting process, an operator removes tires other than those of a specified type corresponding to the rim set on the uniformity inspecting machine from a tire conveyor conveying tires of various types to supply only the tires of the specified type to the uniformity inspecting machine, and stacks up the tires removed from the tire conveyor for temporary storage. Another tire inspecting method sorts tires by type, distributes the sorted tires to sorting conveyors, and stacks the tires of the same type for storage by stacking machines combined respectively with the sorting conveyors.

The product storing method that sorts products at the entrance of the storage yard where the storage conveyors are installed needs many storage conveyors when storing products of many sorts. Therefore, a considerably large space is necessary for installing the storage conveyors and hence equipment cost increases.

If all sorts of products are produced evenly, all the storage conveyors will be substantially evenly used and there will be no idle storage conveyors. However, if the products of different sorts are manufactured unevenly, some of the storage conveyors are rarely used and occupy a large space uselessly. When products of other type are to be stored, an additional storage conveyor must be installed requiring additional space for installation and additional equipment cost.

The work of the operator for selecting the tires of a specified type to be supplied to the uniformity inspecting machine requires heavy labor. Work for returning the stacked tires to the tire conveyor after the rim has been changed for a different rim for holding the tires of other type for inspection also requires heavy labor and cannot be efficiently achieved.

The method that distributes the tires of different types to the corresponding sorting conveyors needs sorting conveyors and stacking machines respectively for the tires of the different types. Therefore, an additional sorting conveyor and an additional stacking machine must be installed when tires of other type are add ed to the tires to be inspected. Thus this method i s unable to cope readily with increase in the types of tires to be inspected.

SUMMARY OF THE INVENTION

The present invention has been made in view of those problems and it is therefore an object of the present invention to provide a method of storing product s capable of storing products in sorted groups in a space of the smallest necessary size by effectively using the space and of efficiently supplying the products to the next process without requiring manual labor.

Another object of the present invention is to provide an inexpensive storage system for carrying out the method of storing products.

According to a first aspect of the present invention, a product storing method that sorts products by sort into groups of sorts and stores the products in groups of sorts in a storage yard comprises the steps of: holding the products delivered to the storage yard one at a time by a holding means included in a storage system and capable of vertically, laterally and longitudinally moving in the storage yard; vertically moving the holding means holding the product; and carrying the product to any storage place chosen for a group including the products by horizontally moving the holding means; and placing the products at the chosen storage place for storage.

Since the storage place Is not predetermined and any vacant place can be used as the storage p lace regardless of the type of the product, space can be efficiently used for storing the products sorted in groups by sort in the storage yard of the smallest necessary area. Even if additional products of other type need to be stored in the storage yard, the storage system is able to sort and store the additional products without requiring any modification.

According to a second aspect of the present invention, a product storing method that sorts annular products by sort into groups of sorts and stores the products in groups of sorts in a storage yard comprises the steps of: holding annular products delivered to the storage yard one at a time in a horizontal position by a holding means included in a storage system and capable of vertically, laterally and longitudinally moving in the storage yard; vertically moving the holding means holding the annular product in a horizontal position; carrying the annular product to any storage place chosen for a group including the annular products by horizontally moving the holding means; and stacking the annular products at the chosen storage place for storage.

Since the annular products of different types are sorted in groups by type and the products of the same type are stacked up at any chosen storage place, space can be further efficiently used and the annular products can be sorted and stored in the storage yard of the lest necessary area. Even if additional annular products of other type need to be stored in the storage yard, the storage system installed in the storage yard is able to sort and store the additional products without requiring any modification.

In the product storing method, it is preferable that the holding means comprises at least two holding arms capable of being moved radially outward and inward, and the holding arms are inserted from above in a central hole of the annular product placed in a horizontal position and are moved radially outward to hold the annular product.

Since the holding arms are pressed against the inner circumference of the annular product, the holding means can be formed in small, lightweight construction and is able to operate to handle the annular product in a minimum space necessary for placing the annular product.

In the product storing method, it is preferable that any one of vacant places in the storage yard is chosen to store products of a specific sort.

Since any one of vacant places in the storage yard can be used for storing products of a specific sort, the storage space can be efficiently used and hence products can be sorted and stored in the smallest necessary space.

In the product storing method, it is preferable that the storage yard is an intermediate storage yard for temporarily storing the products before the products are transferred to an end storage yard.

The storage yard of the smallest necessary area can be used as the intermediate storage yard to use space efficiently to achieve work efficiently.

In the product storing method, it is preferable that the products stored in the intermediate storage yard are carried to a delivering position by the holding means, and a plurality of products are carried collectively by a carrying means to the end storage yard.

Since the products are carried to the delivering position by the holding means and without using any other special carrying means, equipment cost can be reduced and the products can be efficiently carried to the end storage yard.

In the product storage method, the products are tires of different types, the types of the tires are identified to discriminate the tires of the type that can be inspected by a tire inspecting machine from those of other types when supplying the tires to the tire inspecting machine, the tires of the type that can be inspected by the tire inspecting machine are supplied to the tire inspecting machine, and the tires of other types that cannot be inspected by the tire inspecting machine are selected by using the holding means at a position on the receiving side of the tire inspecting machine and are stored in groups of types at any places in the intermediate storage yard.

Since the tires of the type that can be inspected by the tire inspecting machine are supplied to the tire inspecting machine and the rest of the tires are carried to and stored in groups of types at any places in the intermediate storage yard, the tires can be efficiently supplied to the tire inspecting machine without using any manual labor.

Since the tires other than those that are to be supplied to the tire inspecting machine can be stored in groups of types in any vacant places which are not assigned specially to any special groups, space can be efficiently used and the tires can be stored in groups of types in the storage yard of the smallest necessary area. Even if additional tires of other type need to be stored in the storage yard, the storage system installed in the storage yard is able to sort and store the additional tires without requiring any modification.

According to a third aspect of the present invention, a product storage system comprises: a storage yard for storing products therein; a holding means capable of moving vertically, laterally and longitudinally in the storage yard; a first conveying means for conveying products into the storage yard; and a second conveying means for conveying products out of the storage yard.

Products conveyed into the storage yard by the first conveying means are held and carried to any storage place by the holding means and are stored at the storage place, and the products stored at the storage place are transferred to the second conveying means, and the products are conveyed out of the storage yard by the second conveying means.

In the product storage system, it is preferable that the storage yard is an intermediate storage yard for temporarily storing the products before the products are transferred to an end storage yard, and the second conveying means conveys the products from the intermediate storage yard to the end storage yard.

The products temporarily stored in the intermediate storage yard are carried by the holding means and the second conveying means to the end storage yard and are stored in the end storage yard.

According to a fourth aspect of the present invention, a product storage system comprises: an intermediate storage yard lying on the inlet side of a tire inspecting machine for inspecting tires of a specified type; a tire moving means capable of holding a tire, of moving vertically, laterally and longitudinally and of placing the tire at any place in the intermediate storage yard; a first conveying means for conveying tires to the intermediate storage yard; a second conveying means for conveying the tires out of the intermediate storage yard; and a control means for controlling the tire moving means, the first conveying means and the second conveying means; wherein the control means identifies the type of a tire carried into the intermediate storage yard by the first conveying means and decides whether or not the tire can be inspected by the tire inspecting machine, the tire moving means transfers the tire that can be inspected by the tire inspecting machine to the second conveying means, the second conveying means carries the same tire that can be inspected by the tire inspecting machine to the tire inspecting machine, and the tire moving means carries tires other than those that can be inspected by the tire inspecting machine to any places in the intermediate storage yard to store the tires in groups of types at the places.

When a tire that can be inspected by the tire inspecting machine is conveyed to the intermediate storage yard by the first conveying means, the tire moving means transfers the tire from the first conveying means to the second conveying means. When a tire that cannot be inspected by the tire inspecting machine is conveyed to the intermediate storage yard by the first conveying means, the tire moving means carries the tire to any place in the intermediate storage yard to store tires in groups of types. Thus the tires can be efficiently supplied to the tire inspecting machine without using any manual labor.

Since the places at which the tires that cannot be inspected by the tire inspecting machine are stored are not determined beforehand and the tire moving means carries the tires to any vacant places, vacant places in the intermediate storage yard can be efficiently used for storing tires in groups of types and the tires can be sorted and stored in the storage yard of the smallest necessary area. Even if additional tires of other type need to be stored in the intermediate storage yard, the storage system is able to sort and store the additional tires without requiring any modification.

According to a fifth aspect of the present invention, a product storage system comprises: a tire conveying means for conveying tires to a tire inspecting machine for inspecting tires of a specified type; an intermediate storage yard extending along the tire conveying means; a tire moving means capable of holding a tire, of moving vertically, laterally and longitudinally and of placing the tire at any place in the intermediate storage yard; and a control means for controlling the tire conveying means and the tire moving means; wherein the control means identifies the type of a tire carried by the tire conveying means and decides whether or not the tire can be inspected by the tire inspecting machine, the tire conveying means conveys the tire that can be inspected by the tire inspecting machine to the tire inspecting machine, and the tire moving means carries tires other than those that can be inspected by the tire inspecting machine to any places in the intermediate storage yard to store the tires in groups of types at the places.

The tire that can be inspected by the tire inspecting machine is conveyed to the tire inspecting machine and the tires other than those that can be inspected by the tire inspecting machine are held and carried by the tire moving means to any places in the intermediate storage yard and are stored in groups of types. Thus, the tires can be efficiently supplied to the tire inspecting machine without using any manual work, space can be efficiently used and the tires can be sorted and stored in the intermediate storage yard of the smallest necessary area. Even if additional tires of other type need to be stored in the storage yard, the storage system is able to sort and store the additional products without requiring any modification. According to a sixth aspect of the present invention, a product storage system comprises: a tire conveying means having a conveying path for conveying tires to a tire inspecting machine for inspecting tires of a specified type; a roundabout conveying means forming a roundabout path branching from the conveying path of the tire conveying means and returning to the conveying path of the tire conveying means; an intermediate storage yard formed in the roundabout path of the roundabout conveying means; a tire moving means capable of holding a tire and of moving vertically, laterally and longitudinally to place tires at any places in the intermediate storage yard; and control means for controlling the conveying means, the roundabout conveying means and the tire moving means; wherein the control means identifies the type of a tire conveyed by the conveying means, decides whether or not the tire can be inspected by the tire inspecting machine, makes the conveying means convey the tire to the tire inspecting means when the tire is of a type that can be inspected by the tire inspecting machine, and makes the roundabout conveying means convey tires of types other than those that can be inspected by the tire inspecting machine to any places in the intermediate storage yard to store the tires in groups of types at the places.

Thus, tires that can be inspected by the tire inspecting machine are conveyed by the conveying means to the tire inspecting machine, while tires other than those that can be inspected by the tie inspecting machine are conveyed by the roundabout conveying means to the intermediate storage yard and are carried by the tire moving means to any places in the intermediate storage yard to store the tires in groups of types in the intermediate storage yard. Even if additional tires of other type need to be stored in the storage yard, the storage system is able to sort and store the additional products without requiring any modification.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
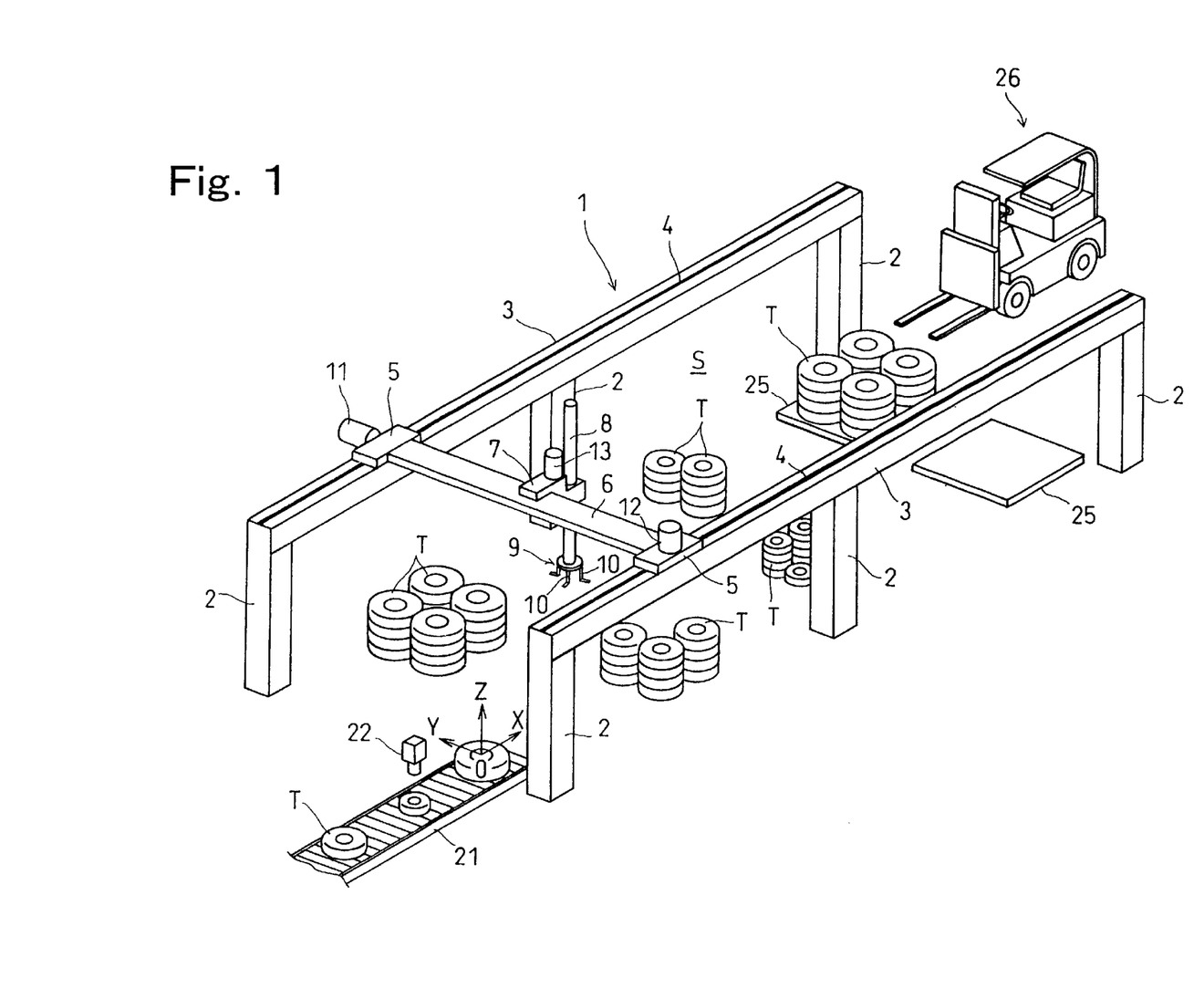
FIG. 1 is a schematic perspective view of a tire storage system in a first embodiment according to the present invention.
Figure 2:
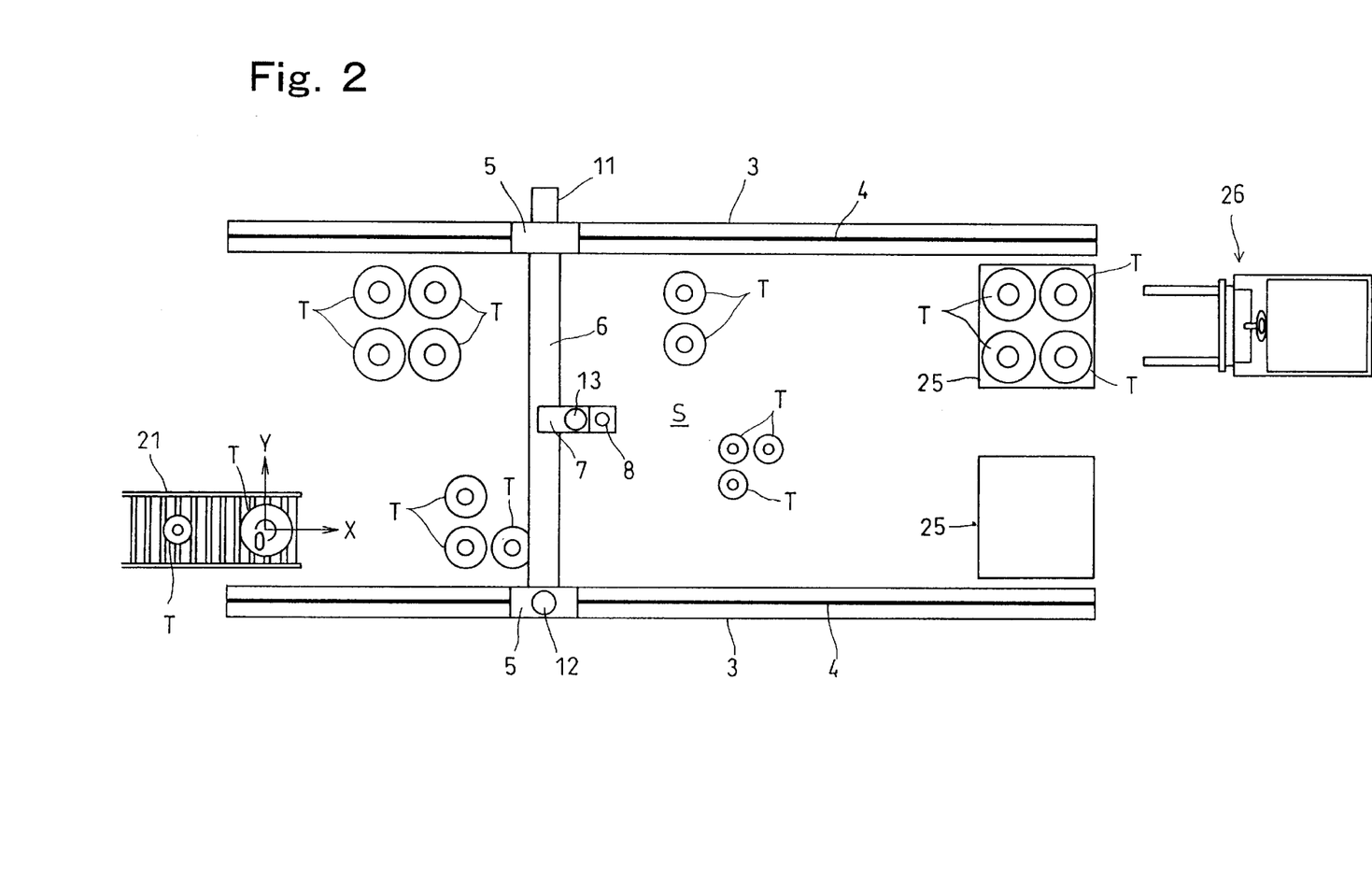
FIG. 2 is a schematic plan view of the tire storage system shown in FIG. 1.

An intermediate tire storage system 1 in a first embodiment according to the present invention will be described with reference to FIGS. 1 to 3. The intermediate tire storage system 1 sorts manufactured tires T of a plurality of different types by type and stores the tires temporarily in groups of types. Referring to FIG. 1, a pair of longitudinal beams 3 are extended in parallel to each other and are supported horizontally on the same level by uprights 2. Rails 4 are laid on the longitudinal beams 3. A tire moving mechanism includes trolleys 5 provided with wheels and capable of traveling along the rails 4, a guide rail 6 extended between the longitudinal beams 3 and having opposite ends connected to the trolleys 5, respectively, a sliding unit 7 supported on the guide rail 6 for movement along the guide rail 6, a vertical shaft 8 held on the sliding unit 7 so as to be vertically movable, and a chuck 9 held on the lower end of the vertical shaft 8 and provided with a plurality of holding arms 10 arranged on a circle. The holding arms 10 can be moved simultaneously radially outward and radially inward. The holding arms 10 of the chuck 9 are inserted in the central hole of a tire T placed in a horizontal position with its center axis vertically extended and are moved radially outward so that the same are pressed against the bead of the tire T to hold the tire T. The holding arms 10 are moved radially inward to release the tire T. Suppose that an X-axis is parallel to the longitudinal beam 3, a Y-axis is parallel to the guide rail 6 and a Z-axis is vertical. Then, the chuck 9 can be moved in directions parallel to the X-axis, the Y-axis and the Z-axis.

An X-axis motor 11 is mounted on one of the trolleys 5. The X-axis motor 11 drives the wheels of the trolley 5 to move the guide rail 6 in longitudinal directions parallel to the X-axis. A Y-axis motor 12 is mounted on the other trolley 5 to drive the sliding unit 7 through timing-belt pulleys and a timing belt for movement in lateral directions parallel to the Y-axis. A Z-axis motor 13 is mounted on the sliding unit 7 to drive the vertical shaft 8 provided with a rack through a pinion engaged with the rack for movement in vertical directions parallel to the Z-axis. Thus, the chuck 9 is moved in longitudinal directions parallel to the X-axis by the X-axis motor 11, in lateral directions parallel to the Y-axis by the Y-axis motor 12 and in vertical directions parallel to the Z-axis by the Z-axis motor 13. The holding arms 10 of the chuck 9 are moved radially by a chuck driving motor 14 (FIG. 3).

A space between the pair of parallel longitudinal beams 3 is an intermediate storage yard S of the intermediate tire storage system 1. The chuck 9 can be moved in the entire space of the intermediate storage yard S. The unloading end of a delivery conveyor 21 is located in a corner of the entrance of the intermediate storage yard S. Pallets 25 are stored at the exit of the intermediate storage yard S. When a predetermined number of the tires T are stacked on the pallet 25, a forklift truck 26 carries the pallet 25 loaded with the tires T to an end storage yard.

Figure 3:
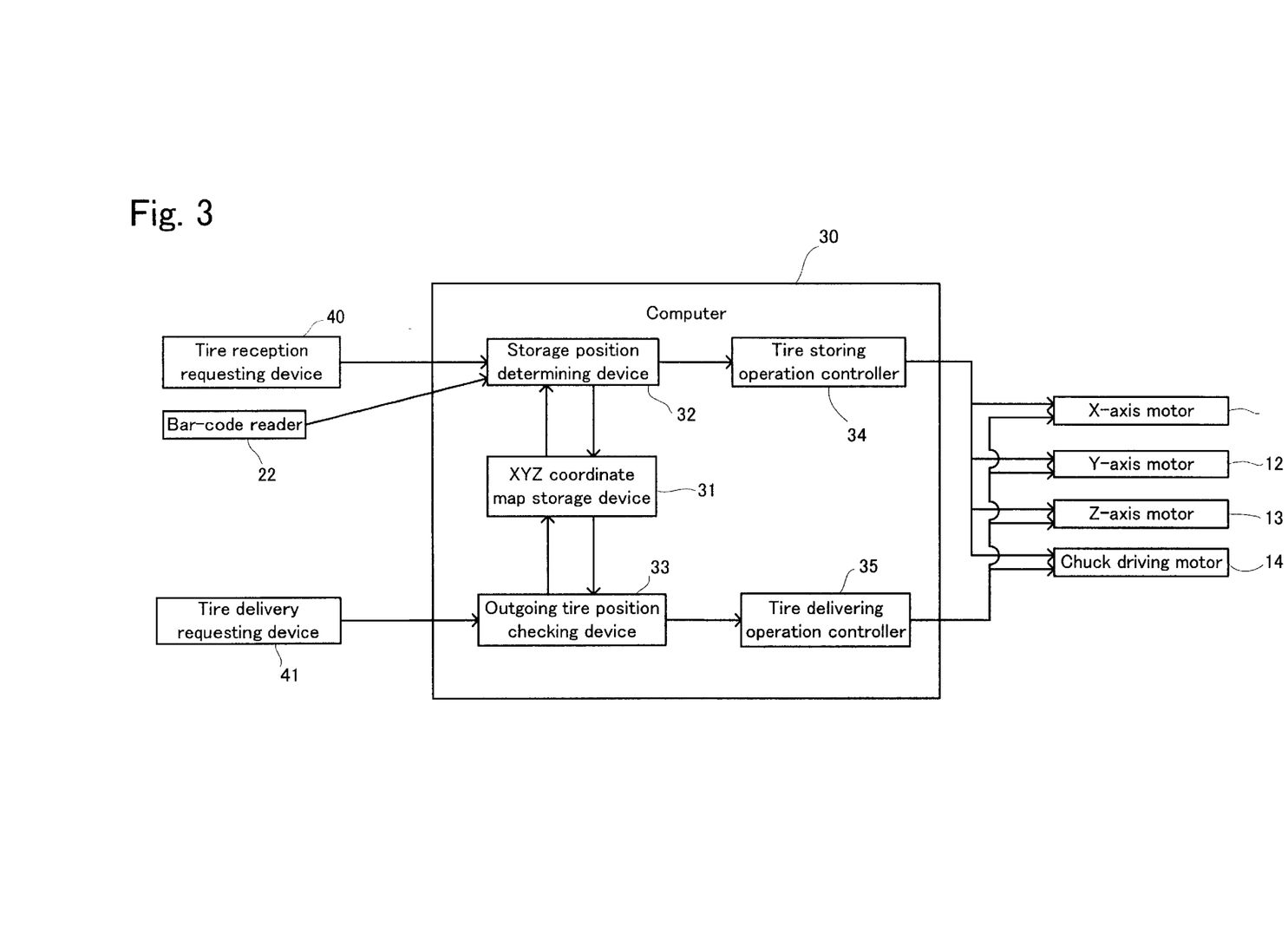
FIG. 3 is a block diagram of a control system included in the tire storage system shown in FIG. 1.

FIG. 3 shows a control system including a computer 30 for controlling the intermediate tire storage system 1. The computer 30 has an XYZ coordinate map storage device 31. The XYZ coordinate map storage device 31 stores an XYZ coordinate map indicating positions of groups of the tires T of different types in the intermediate storage yard S on a coordinate system defined by the X-, the Y- and the Z-axis. The manufactured tire T is provided with a label indicating the type of the tire T by a bar code on its side wall at a position near the bead. A bar-code reader 22 disposed at a position corresponding to the middle of the delivery conveyor 21 reads the bar code on the label to identify the type of the tire T. The tire T may be identified in a tire size reading process of uniformity inspection that is conducted before the tire T is put on the delivery conveyor 21. Although the origin O of the XYZ coordinate system may be at any position in the intermediate storage yard S, in this embodiment, the origin o is at the center of the tire T located at the unloading end of the delivery conveyor 21 as shown in FIGS. 1 and 2. The sets of XYZ coordinates and the types of all the tires T stored in the intermediate storage yard S are stored in combination in the XYZ coordinate map storage device 31.

The computer 30 includes a storage position determining device 32 that determines a storage position for an incoming tire T delivered to the intermediate storage yard S on the basis of data stored in the XYZ coordinate map storage device 31, and an outgoing tire position checking device 33. Upon the reception of a tire reception request signal from a tire reception requesting device 40, the storage position determining device 32 receives an identification signal indicating a tire T to be received from the bar-code reader 22, determines a storage position for the tire T on the basis of data stored in the XYZ coordinate map storage device 31 indicating the arrangement of tires T in the intermediate storage yard S, and gives storage position information about the storage position to a tire storing operation controller 34. The tire storing operation controller 34 drives the X-axis motor 11, the Y-axis motor 12, the Z-axis motor 13 and the chuck driving motor 14 on the basis of the storage position information to carry the tire T delivered to the intermediate storage yard S by the delivery conveyor 21 to a storage position specified by the storage position information.

Upon the reception of a tire delivery request signal from a tire delivery requesting device 41, the outgoing tire position checking device 33 finds the storage position of the tire T to be delivered on the basis of position information about the arrangement of tires T included in the XYZ coordinate map stored in the XYZ coordinate map storage device 31 and gives position information about the position of the tire T to a tire delivering operation controller 35. The tire delivering operation controller 35 drives the X-axis motor 11, the Y-axis motor 12, the Z-axis motor 13 and the chuck driving motor 14 on the basis of the storage position information to carry the tire T onto the pallet 25 located at a loading position.

When there are tires of the same type as that of the tire T that has been just delivered to the intermediate storage yard S stored previously at a storage position in the intermediate storage yard S, the tire T is stored at a storage position near the storage position where the tires of the same type are stored beforehand or is put on top of a stack of the previously stored tires. When there is no tire of the same type as that of the tire T that has been just delivered to the intermediate storage yard S or a predetermined number of tires of the same type are stacked in a group at a storage position, the tire T is stored at any vacant place. Thus, the tires of the same type are stored in a group.

When a tire reception request signal is provided by the tire reception requesting device 40 and the intermediate tire storage system 1 is in a tire receiving mode, the delivery conveyor 21 delivers tires T of various types successively, the bar-code reader 22 reads the bar codes on the labels attached to the tires T, and the chuck 9 is located at a position represented by a set of XY coordinates (0, 0) and is lowered to a position represented by a set of XYZ coordinates (0, 0, 0). Then, the chuck 9 is inserted in the central hole of the tire T placed in a horizontal position on the unloading end of the delivery conveyor 21 and the holding arms 10 are moved radially outward to hold the tire T. The chuck 9 thus holding the tire T is raised and is moved to a position corresponding to a position determined by the storage position determining device 32, and the tire T is released at the same position for storage.

Any special storage positions are not determined beforehand for tires T of different types; any vacant places are assigned to the tires T of different types to store the tires T in groups of types. Thus, vacant places in the intermediate storage yard S can be used for storing tires T of any types. Thus, space can be efficiently used for storing tires T sorted in groups by type in the intermediate storage yard S of the smallest necessary area. Even if additional tires T of other type need to be stored in the intermediate storage yard S, any additional equipment does not need to be installed and the intermediate storage yard S does not need to be expanded and the intermediate storage yard S can be flexibly used. Therefore any cost is not necessary to store the additional tires of other type.

Tires T of the same type can be stacked up in an upright stack by putting a tire T of the same type on top of the stack of the tires T by locating the chuck 9 holding the tire T with its XY coordinates coinciding with those of the center of the stack of tires T. Therefore, the stack of tires T will not collapse.

The sets of XYZ coordinates of all the tires T thus sorted and stacked in groups of types are recorded on an XYZ coordinate map in combination with the types of those tires T in the XYZ coordinate map storage device 31. The Z-coordinate of the tire T represents the height of each tire T. The upper tires T in a stack have greater Z-coordinates, respectively.

The intermediate tire storage system 1 is set in a delivery mode when the tire delivery requesting device 41 provides a tire delivery request signal. Then, the tires T of a group are held by the chuck 9 and moved to a loading position where the tires T are loaded onto the pallet 25. One or a plurality of tires T of a group are moved at a time to the loading position. When carrying a plurality of tires T of a group at a time, the chuck 9 is lowered through the central holes of the plurality of tires T, the holding arms 10 are moved radially outward to hold the lowermost one of the plurality of tires T and the chuck 9 is raised with the plurality of tires T. Thus, the plurality of tires T can be simultaneously moved to the pallet 25. After a predetermined number of tires T of the same type have been loaded onto the pallet 25, the forklift truck 26 carries the pallet 25 loaded with the tires T to the end storage yard.

The tire reception requesting device 40 requests the tire receiving operation and the tire delivery requesting device 41 requests a tire delivering operation. The computer 30 may select either the tire receiving operation or the tire delivering operation and may control the tire reception requesting device 40 and the tire delivery requesting device 41 accordingly or an operator may control the tire reception requesting device 40 and the tire delivery requesting device 41 in a remote-control mode according to the condition of the intermediate storage yard S.

This intermediate tire storage system 1 uses the intermediate storage yard S for temporarily storing tires, and the forklift truck 26 transfers the tires from the intermediate storage yard S to the end storage yard. The intermediate storage yard S may be used as the end storage yard or pallets loaded with the tires may be loaded into a truck for shipping.

The intermediate tire storage system 1 may be provided with two tire moving mechanisms similar to the foregoing tire moving mechanism, and the delivery conveyor 21 may be used in common by the two tire moving mechanism. Both the tire receiving operation and the tire delivering operation can be simultaneously carried out by using the two tire moving mechanisms, which enhances the efficiency of the intermediate tire storage system 1.

Although the invention has been described as applied to the intermediate tire storage system, the present invention is applicable to a storage system for storing products other than tires. The storage system according to the present invention is able to utilize space effectively and to sort and store efficiently a large variety of products in a storage yard of the smallest necessary area.

An intermediate tire storage system 51 in a second embodiment according to the present invention will be described with reference to FIGS. 4 to 7. This intermediate tire storage system 51 has an intermediate storage yard S for storing tires T of different types. The tires T are supplied from the intermediate storage yard S to a uniformity inspecting machine U.

Figure 4:
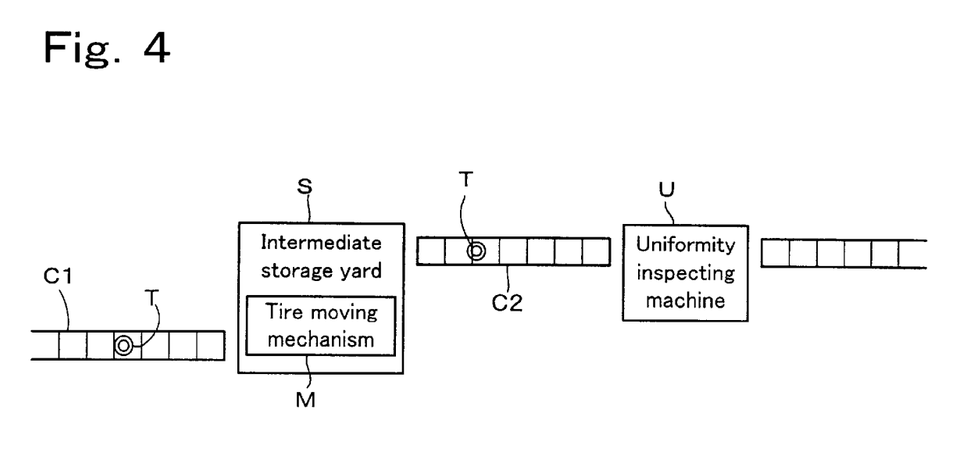
FIG. 4 is a layout of a tire storage system in a second embodiment according to the present invention.

Referring to FIG. 4, a tire T conveyed by a delivery conveyor C1 to the intermediate storage yard S is moved by a tire moving mechanism M installed in the intermediate storage yard S to and placed at any position in the intermediate storage yard S for temporary storage or is transferred by the tire moving mechanism M to a supply conveyor C2. The supply conveyor C2 conveys the tire T to the uniformity inspecting machine U. The uniformity inspecting machine U measures the tire T to determine the uniformity of the tire T. The tire T is put on a rim of a specific type conforming to the type of the tire T on the uniformity inspecting machine U. Therefore, only tires T of the type corresponding to that off the rim can be inspected by the uniformity inspecting machine U. When inspecting tires T of a different type, the rim must be replaced with a different rim of a type corresponding to the type of the tires T. It is efficient to subject only tires T of a type corresponding to that of the rim successively to uniformity inspection.

Figure 5:
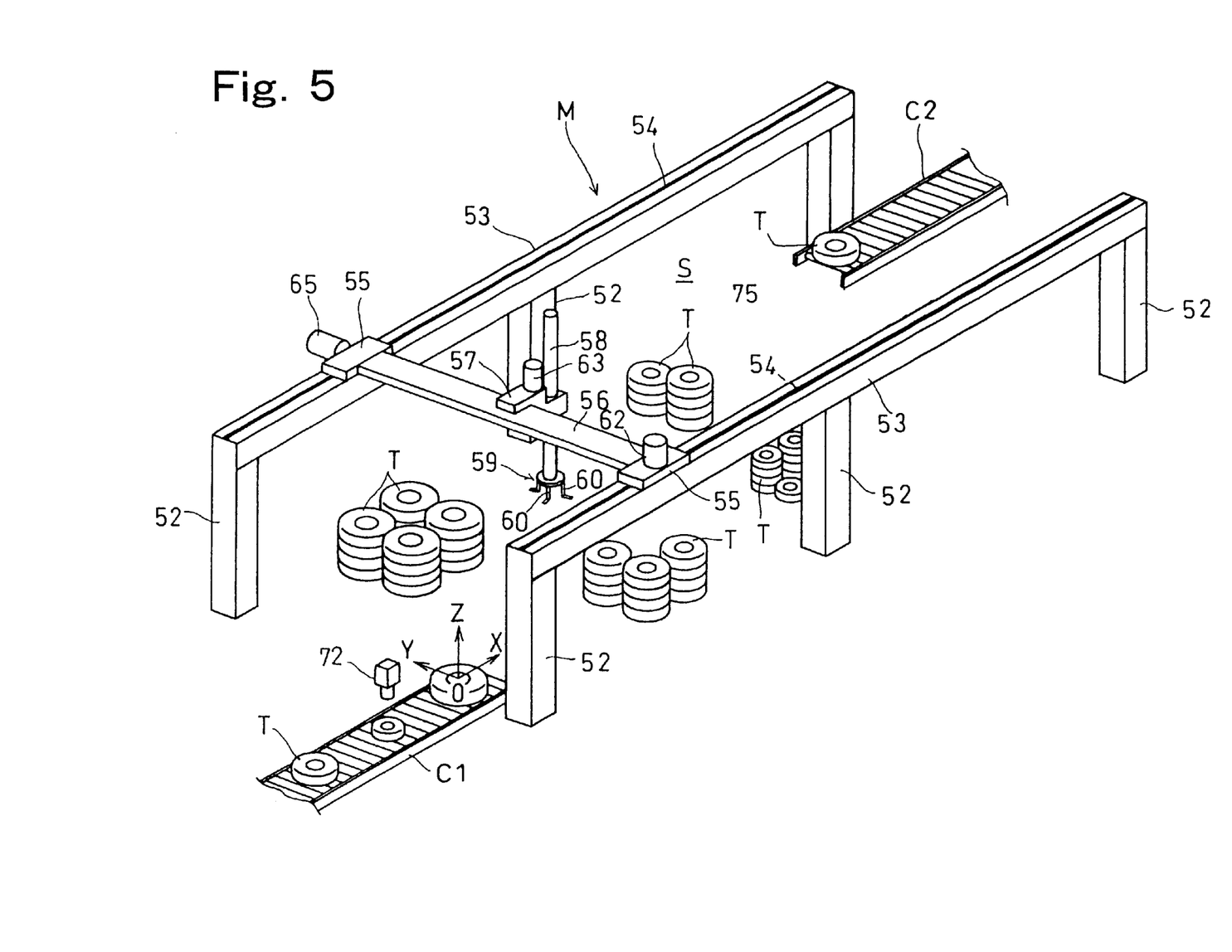
FIG. 5 is a schematic perspective view of the tire storage system in the second embodiment.
Figure 6:
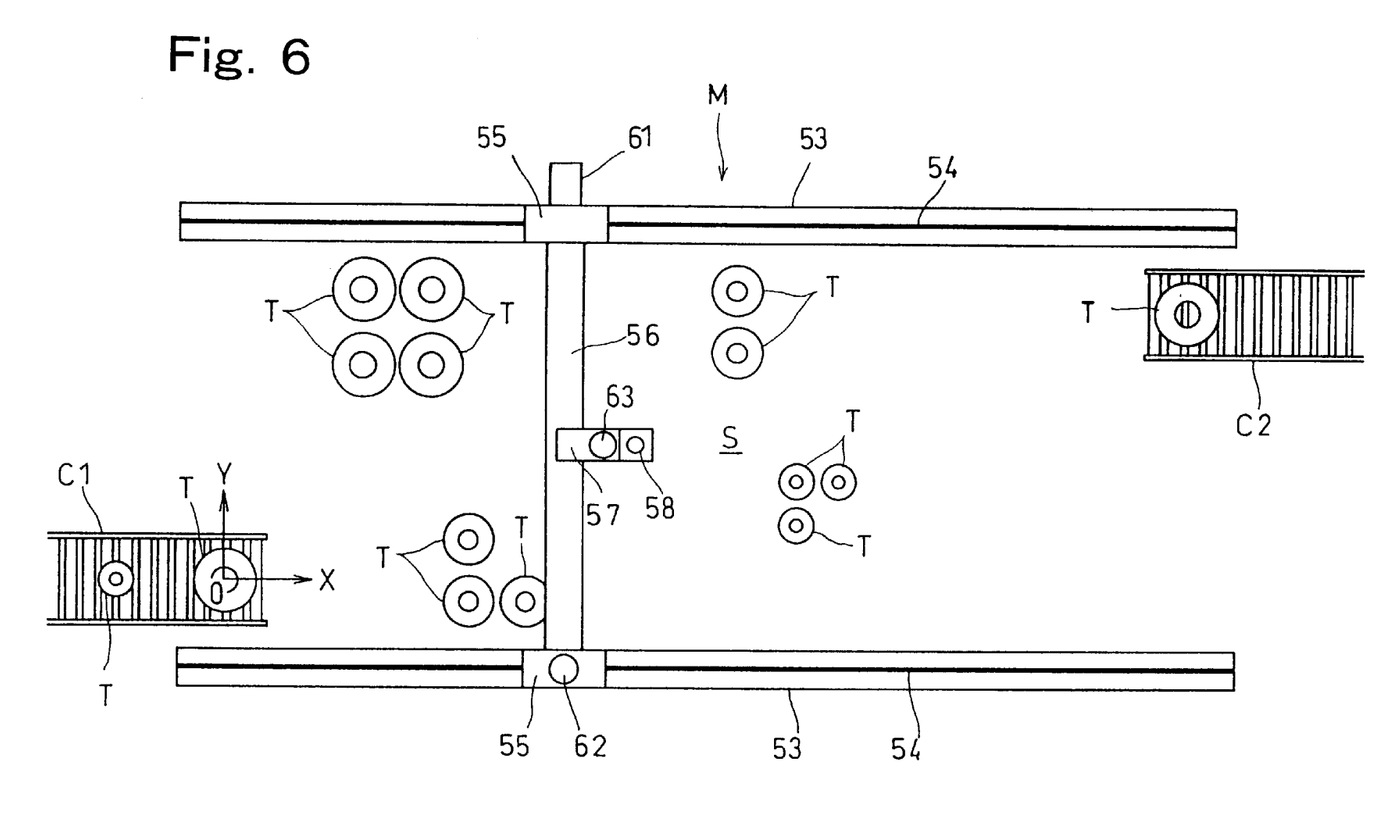
FIG. 6 is a schematic plan view of the tire storage system shown in FIG. 5.

FIGS. 5 and 6 show the intermediate storage yard S and the tire moving mechanism M. A pair of longitudinal beams 53 are extended in parallel to each other and are supported horizontally on the same level by uprights 52. Rails 54 are laid on the longitudinal beams 53. A tire moving mechanism includes trolleys 55 provided with wheels and capable of traveling along the rails 54, a guide rail 56 extended between the longitudinal beams 53 and having opposite ends connected to the trolleys 55, respectively, a sliding unit 57 supported on the guide rail 56 for movement along the guide rail 56, a vertical shaft 58 held on the sliding unit 57 so as to be vertically movable, and a chuck 59 held on the lower end of the vertical shaft 58 and provided with a plurality of holding arms 60 arranged on a circle. The holding arms 60 can be moved simultaneously radially outward and radially inward. The holding arms 60 of the chuck 59 are inserted in the central hole of a tire T placed in a horizontal position with its center axis vertically extended and are moved radially outward so that the same are pressed against the bead of the tire T to hold the tire T. The holding arms 60 are moved radially inward to release the tire T. Suppose that an X-axis is parallel to the longitudinal beam 53, a Y-axis is parallel to the guide rail 56 and a Z-axis is vertical. Then, the chuck 59 can be moved in directions parallel to the X-axis, the Y-axis and the Z-axis.

An X-axis motor 61 is mounted on one of the trolleys 55. The X-axis motor 61 drives the wheels of the trolley 5 to move the guide rail 56 in longitudinal directions parallel to the X-axis. A Y-axis motor 62 is mounted on the other trolley 5 to drive the sliding unit 57 through timing-belt pulleys and a timing belt for movement in lateral directions parallel to the Y-axis. A Z-axis motor 63 is mounted on the sliding unit 57 to drive the vertical shaft 58 provided with a rack through a pinion engaged with the rack for movement in vertical directions parallel to the Z-axis. Thus, the chuck 59 is moved in longitudinal directions parallel to the X-axis by the X-axis motor 61, in lateral directions parallel to the Y-axis by the Y-axis motor 62 and in vertical directions parallel to the Z-axis by the Z-axis motor 63. The holding arms 60 of the chuck 59 are moved radially by a chuck driving motor 64, not shown in FIG. 5.

A space between the pair of parallel longitudinal beams 53 is an intermediate storage yard S of the intermediate tire storage system 51. The chuck 59 can be moved in the entire space of the intermediate storage yard S. A delivery conveyor C1 is disposed with its unloading end located in a corner of the entrance of the intermediate storage yard S. A supply conveyor C2 is disposed with its loading end located in a corner of the exit of the intermediate storage yard S.

Figure 7:
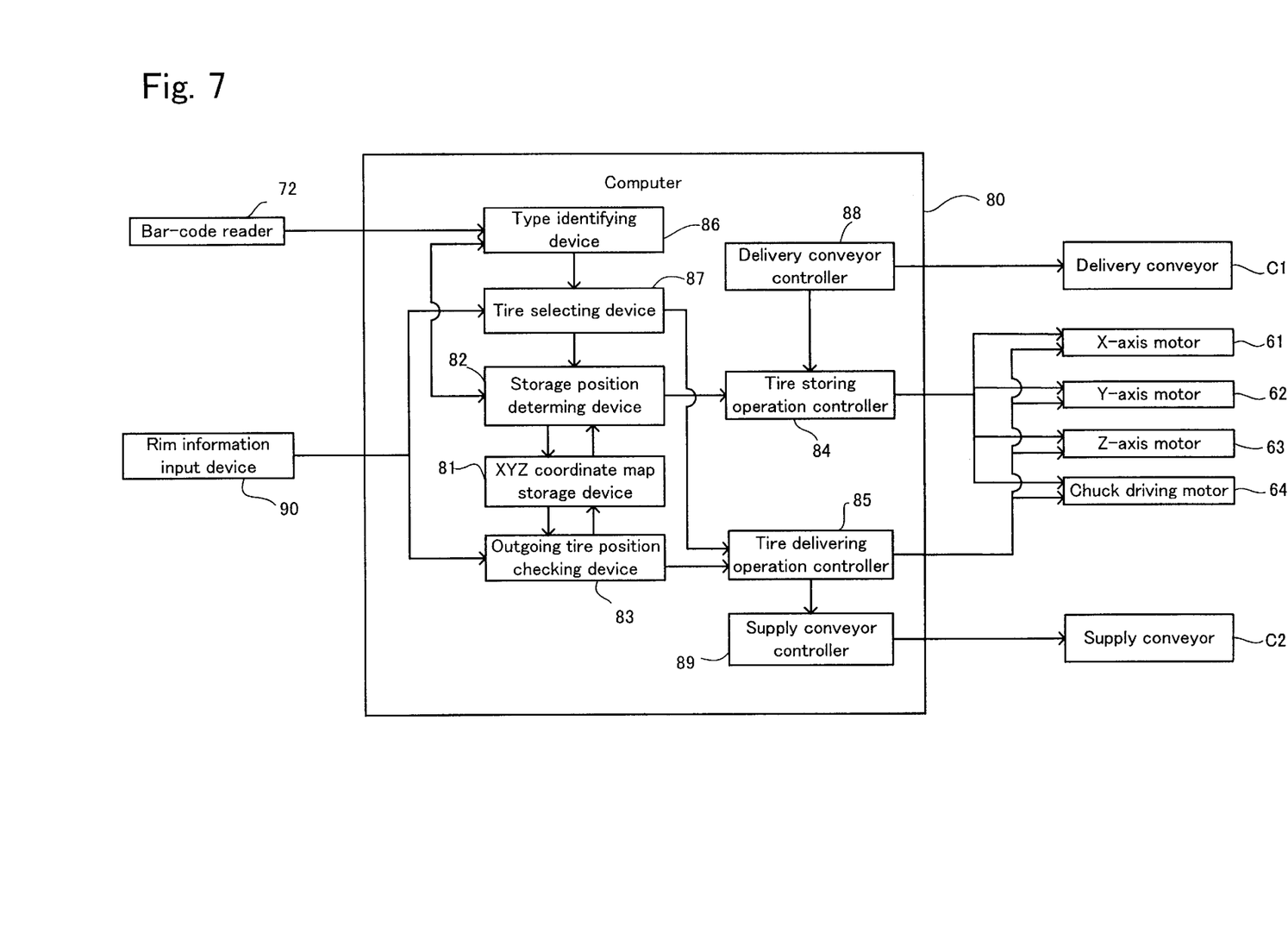
FIG. 7 is a block diagram of a control system included in the tire storage system shown in FIG. 5.

FIG. 7 shows a control system including a computer 80 for controlling the intermediate tire storage system 51. The computer 80 has a delivery conveyor controller 88 for controlling the delivery conveyor C1, a supply conveyor controller 89 for controlling the supply conveyor C2, and an XYZ coordinate map storage device 81 storing an XYZ coordinate map including sets of XYZ coordinates indicating positions of tires T of different types in the intermediate storage yard S on a coordinate system defined by the X-, the Y- and the Z-axis. The sets of XYZ coordinates and the types of all the tires T stored in the intermediate storage yard S are stored in combination in the XYZ coordinate map storage device 81. The manufactured tire T is provided with a label indicating the type of the tire T by a bar code on its side wall at a position near the bead. A bar-code reader 72 disposed at a position corresponding to the middle of the delivery conveyor C1 reads the bar code on the label to identify the type of the tire T. A type identifying device 86 identifies the type of the tire T. Information about the tire T including size may be read while the tire T is on the delivery conveyor C1 or before the tire T is placed onto the delivery conveyor C1.

Although the origin 0 of the XYZ coordinate system may be at any position in the intermediate storage yard S, in this embodiment, the origin 0 is at the center of the tire T located at the unloading end of the delivery conveyor C1 as shown in FIGS. 5 and 6.

The sets of XYZ coordinates indicating the positions of the tires T stored in the intermediate storage yard S and the types of the same are stored in combination in the XYZ coordinate map storage device 81.

The computer 80 includes a storage position determining device 82 that determines a storage position for an incoming tire T delivered to the intermediate storage yard S on the basis of data stored in the XYZ coordinate map storage device 81, and an outgoing tire position checking device 83.

The bar-code reader 72 gives tire information about a tire including the type of the tire to the computer 80 and a rim information input device 90 gives rim information including the size of the rim used at present on the uniformity inspecting machine U to the computer 80. The bar-code reader 72 gives tire information to the type identifying device 86. A tire selecting device 87 compares the rim information and the tire information to decide whether the tire is of the type corresponding to the type of the rim used at present on the uniformity inspecting machine U. The tire is sent directly to the uniformity inspecting machine U when the type of the tire corresponds to that of the rim or is stored in the intermediate storage yard S when the type of the tire does not correspond to that of the rim.

Upon the reception of a storage signal requesting the storage of the tire T from the tire selecting device 87, a storage position determining device 82 decides a position where the tire T is to be stored on the basis of tire information including the type of the tire T and the arrangement of tires T represented by the XYZ coordinate map stored in the XYZ coordinate map storage device 81 and gives information about a storage position for the tire T to a tire storing operation controller 84. The tire storing operation controller 84 drives the X-axis motor 61, the Y-axis motor 62, the Z-axis motor 63 and the chuck driving motor 64 on the basis of the storage position information to carry the tire T delivered to the intermediate storage yard S by the delivery conveyor C1 to a storage position specified by the storage position information. When there are tires of the same type as that of the tire T that has been just delivered to the intermediate storage yard S stored previously at a storage position in the intermediate storage yard S, the tire T is stored at a storage position near the storage position where the tires of the same type are stored beforehand or is put on top of a stack of the previously stored tires. When there is no tire of the same type as that of the tire T that has been just delivered to the intermediate storage yard S or a predetermined number of tires of the same type are stacked in a group at a storage position, the tire T is stored at any vacant place. Thus, the tires of the same type are stored in a group.

The delivery conveyor controller 88 drives the delivery conveyor C1 to deliver tires T of various types successively, the bar-code reader 72 reads the bar codes on the labels attached to the tires T, and the chuck 9 is located at a position represented by a set of XY coordinates (0, 0) and is lowered to a position represented by a set of XYZ coordinates (0, 0, 0). Then, the chuck 9 is inserted in the central hole of the tire T placed in a horizontal position on the unloading end of the delivery conveyor C1 and the holding arms 60 are moved radially outward to hold the tire T. The chuck 9 thus holding the tire T is raised and is moved to a position corresponding to a position determined by the storage position determining device 82, and the tire T is released at the same position for storage.

Any special storage positions are not determined beforehand for tires T of different types; any vacant places are assigned to the tires T of different types to store the tires T in groups of types. Thus, vacant places in the intermediate storage yard S can be used for storing tires T of any types. Thus, space can be efficiently used for storing tires T sorted in groups by type in the intermediate storage yard S of the smallest necessary area.

When the tire selecting device 87 decides that the tire T that has been just delivered by the delivery conveyor C1 to the intermediate storage yard S is of a type corresponding to that of the rim being used at present on the uniformity inspecting machine U and can be inspected by the uniformity inspecting machine U, the tire selecting device 87 gives a tire supply signal to a tire supply operation controller 85. Then, the tire supply operation controller 85 drives the X-axis motor 61, the Y-axis motor 62, the Z-axis motor 63 and the chuck driving motor 64 to pick up the tire T from the delivery conveyor C1 and to transfer the tire T to the supply conveyor C2. When the tire T is loaded onto the supply conveyor C2, the supply conveyor controller 89 droves the supply conveyor C2 to supply the tire T to the uniformity inspecting machine U. The tire T is put on the rim and is subjected to uniformity inspection.

As mentioned above, the tires T of types not corresponding to that of the rim delivered to the intermediate storage yard S are stacked in groups of types at optional positions in the intermediate storage yard S for temporary storage, while the tires T of types corresponding to that of the rim delivered to the intermediate storage yard S are loaded onto the supply conveyors C2, and the supply conveyors C2 conveys those tires T to the uniformity inspecting machine U. These operations are carried out completely automatically without requiring any manual operations, so that the tires T can be efficiently supplied to the uniformity inspecting machine U. When the rim being used on the uniformity inspecting machine U is replaced with a different one to start inspecting tires of a different type, the rim information input device 90 enters rim information about the different rim into the computer 80. Then, the tire identifying device 86 identifies the types of tires T delivered by the delivery conveyor C1 to the intermediate storage yard S, the tire selecting device 87 discriminates between tires T to be supplied to the uniformity inspecting machine U and those to be stored temporarily in the intermediate storage yard S. The tires to be supplied to the uniformity inspecting machine U are supplied to the uniformity inspecting machine U and those to be stored are stored temporarily in the intermediate storage yard S.

When the rim is replaced with DJ a different one and tires T of a type corresponding to that of the different rim are stored in the intermediate storage yard S, the outgoing tire position checking device 83 receives rim information from the rim information input device 90 finds the position of the tires T of a type corresponding to that of the different rim on the basis of the position information included in the XYZ coordinate map stored in the XYZ coordinate map storage device 81, and gives position information about the position of the tires T to the tire supply operation controller 85. The tire supply operation controller 85 drives the X-axis motor 61, the Y-axis motor 62, the Z-axis motor 63 and the chuck driving motor 64 to pick up the tire T from the delivery conveyor C1 and to transfer the tire T to the supply conveyor C2. Then, the supply conveyor controller 89 drives the supply conveyor C2 to supply the tire T to the uniformity inspecting machine U. When tires T of a type corresponding to that of the rim are stored in the intermediate storage yard S and tires T of the same type are delivered additionally to the intermediate storage yard S, the tire T near the chuck 59 may be preferentially moved to the supply conveyor C2. Even if additional tires T of other type are delivered to the intermediate storage yard S, any additional equipment does not need to be installed and the intermediate storage yard S does not need to be expanded and the intermediate storage yard S can be flexibly used. Therefore any cost is not necessary to store the additional tires of other type.

Tires T of the same type can be stacked up in an upright stack by putting a tire T of the same type on top of the stack of the tires T by locating the chuck 59 holding the tire T with its XY coordinates coinciding with those of the center of the stack of tires T. Therefore, the stack of tires T will not collapse.

The sets of XYZ coordinates of all the tires T thus sorted and stacked in groups of types are recorded on an XYZ coordinate map in combination with the types of those tires T in the XYZ coordinate map storage device 81. The Z-coordinate of the tire T represents the height of each tire T. The upper tires T in a stack have greater Z-coordinates, respectively.

Figure 8:
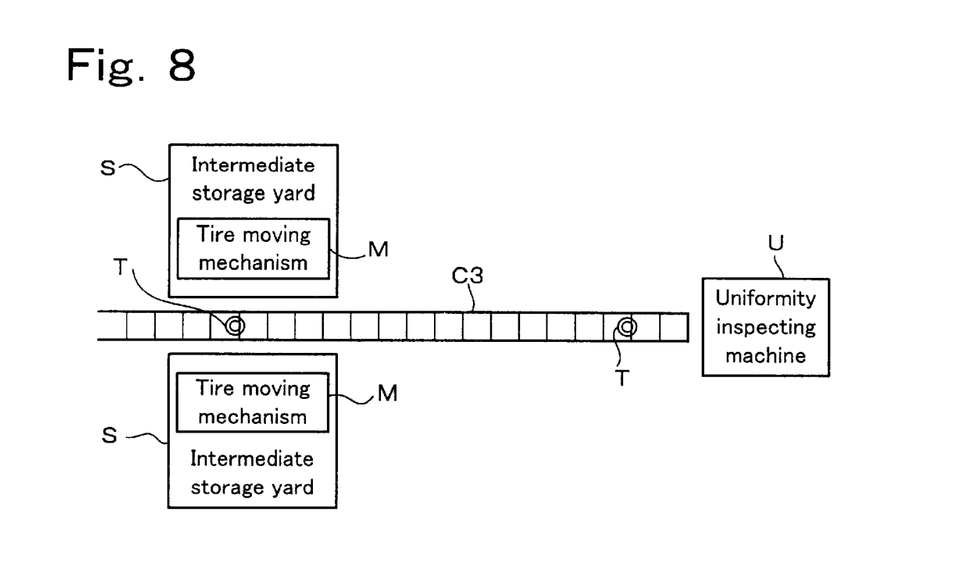
FIG. 8 is a layout of a tire storage system in a third embodiment according to the present invention.

A tire storage system in a third embodiment according to the present invention will be described with reference to FIG. 8. This tire storage system supplies a tire T of a type corresponding to that of a rim being used on a uniformity inspecting machine U directly to the uniformity inspecting machine U. A delivery conveyor C3 is extended to the uniformity inspecting machine U to supply a tire T directly to the uniformity inspecting machine U. Intermediate storage yards S are disposed on the opposite sides of a middle section of the delivery conveyor C3. The intermediate storage yards S are provided with tire moving mechanisms M, respectively. The tire moving mechanisms M are the same as those of the foregoing embodiments. Each tire moving mechanism M is capable of picking up a tire T from the delivery conveyor C3, of moving the tire T to a desired position and of putting a tire on the delivery conveyor C3. The type of a tire T conveyed by the delivery conveyor C3 is identified before the tire T reaches a position corresponding to the intermediate storage yards S. A tire T of a type corresponding to that of the rim being used on the uniformity inspecting machine U is conveyed straight to the uniformity inspecting machine U without stopping at a place corresponding to the intermediate storage yards S and is subjected to uniformity inspection. A tire T of a type not corresponding to that of the rim being used on the uniformity inspecting machine U is stopped at a place between the intermediate storage yards S and is removed from the delivery conveyor C3 by the tire moving mechanism M of either of the intermediate storage yards S. Thus, the tires T removed from delivery conveyor C3 are sorted and stored temporarily in groups of types at any positions in the intermediate storage yards S.

When the rim on the uniformity inspecting machine U is replaced with a different one of a different type for inspecting tires T of other type, the tires T of other type are put on the delivery conveyor C3 by the tire moving mechanism M and are supplied to the uniformity inspecting machine U for uniformity inspection. Thus, the tires can be efficiently supplied to the uniformity inspecting machine U without using any manual labor. Since the tires other than those that are to be supplied to the tire inspecting machine U can be stored in groups of types in any vacant places in the intermediate storage yard S which are not assigned specially to any special groups, space can be efficiently used and the tires can be sorted and stored in groups of types in the storage yard S of the smallest necessary area.

Figure 9:
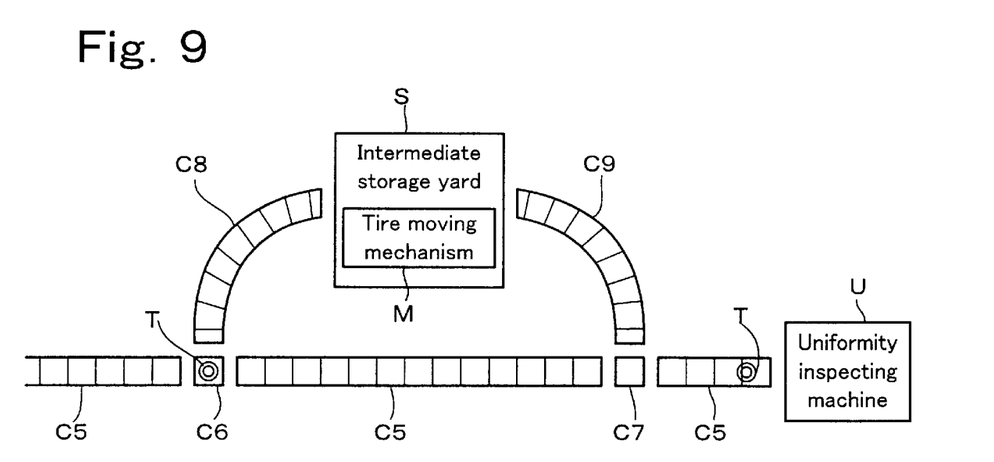
FIG. 9 is a layout of a tire storage system in a fourth embodiment according to the present invention.

A tire storage system in a fourth embodiment according to the present invention will be described with reference to FIG. 9. A delivery conveyor C5 for conveying tires T to a uniformity inspecting machine U is provided with two transfer conveyors C6 and C7. A first roundabout conveyor C8 extends between the upstream transfer conveyor C6 and an intermediate storage yard S, and a second roundabout conveyor C9 extends between the intermediate storage yard S and the downstream transfer conveyor C7. The type of a tire T conveyed by the delivery conveyor C5 is identified previously. If the type of the tire T corresponds to that of a rim in use on the uniformity inspecting machine U, the tire T is supplied straight to the uniformity inspecting machine U by the delivery conveyor C5. If the type of the tire T does not correspond to that of the rim, is transferred from the delivery conveyor C5 to the roundabout conveyor C8 by the transfer conveyor C6 and is conveyed to the intermediate storage yard S. The tire T is held and moved by a tire moving mechanism M and placed at any vacant position in the intermediate storage yard S. Thus, tires of types not corresponding to that of the rim are sorted and stored temporarily in groups of types at any vacant positions in the intermediate storage yard S.

When the rim on the uniformity inspecting machine U is replaced with a different one to inspect the tires T of a type corresponding to that of the different rim stored in the intermediate storage yard S, the tires T are put on the second roundabout conveyor C9, the second roundabout conveyor C9 conveys the tires T to the transfer conveyor C7 and the transfer conveyor C7 transfers the tires T from the second roundabout conveyor C9 to the delivery conveyor C5. Then the delivery conveyor C5 delivers the tires T to the uniformity inspecting machine U for uniformity inspection. Thus, the tires T can be efficiently supplied to the uniformity inspecting machine U without using manual labor. Since the tires are stored in groups of types at any vacant places which are not assigned specially to any special groups, space can be efficiently used and the tires can be stored in groups of types in the storage yard S of the smallest necessary area.

Although the invention has been described in its preferred embodiments with a certain degree of particularity, obviously many change and variations are possible therein. It is therefore to be understood that the present invention may be practiced otherwise than as specifically describe herein without departing from the scope and spirit thereof.

What is claimed is:

1. A tire storing method that conveys tires to a storage yard and to a tire inspecting machine, comprising the steps of:

providing a first conveying device that conveys tires to said storage yard;

providing a second conveying device that conveys said tires from said storage yard to said tire inspecting machine;

identifying a type of each tire which is to be conveyed by said first conveying device to said storage yard and delivering a tire type signal;

supplying a tire inspection signal regarding a type of tires being inspected by the tire inspecting machine;

determining that a tire being conveyed by said first conveying device is to be transferred to said second conveying device when said tire type signal and said tire inspection signal coincide with each other regarding the type;

determining that the tire being conveyed by said first conveying device is to be moved said storage yard when said tire type signal and said tire inspection signal do not coincide with each other regarding the type;

operating a moving mechanism to move the tire on said first conveying device directly to said second conveying device when it is determined that the tire being conveyed by said first conveying device is to be transferred to said second conveying device;

operating said moving mechanism to move the tire on said first conveying device to a location in said storage yard when it is determined that the tire being conveyed by said first conveying device is to be moved to said storage yard; and storing tires thus moved to the storage yard in groups of types of tires.

2. The tire storing method according to claim 1, further comprising the step of;

storing the tires moved to said storage yard by stacking the tires horizontally.

3. The tire storing method according to claim 1, further comprising the steps of;

providing said moving mechanism with holding arms;

radially inwardly moving the holding arms;

inserting the holding arms into a central hole of each tire;

radially outwardly moving the holding arms to hold the tire; and then moving the tire in said vertical, lateral and longitudinal directions.

4. A tire storage system comprising:

a storage yard provided at an inlet side of a tire inspecting machine;

a tire inspecting information device that supplies a tire inspection signal regarding a type of tires being inspected by the tire inspecting machine;

a first conveying device that conveys tires to said storage yard;

a second conveying device that conveys the tires out of said storage yard and to said tire inspecting machine;

a reader that identifies a type of each tire which is to be conveyed by said first conveying device to said storage yard and delivers a tire type signal;

a tire moving mechanism provided above the storage yard to hold a tire and to move the tire in a vertical direction, in a lateral direction and in a longitudinal direction to put the tire at a place in the storage yard;

a control device that controls said tire moving mechanism, said control device including;

a tire type identifying device that receives the tire type signal from said reader and identifies the type of tire being conveyed to the storage yard;

a coordinate map storage device for storing data of position of a tire in said storage yard with respect to a coordinate made up of said vertical, lateral and longitudinal directions;

a tire selecting device operating in response to a signal from said tire type identifying device and said tire inspection signal from the tire inspecting information device, to determine that the tire being conveyed by said first conveying device is to be transferred to said second conveying device when the signals of tire type from the tire type identifying device and the tire inspecting information device coincide with each other and to determine that the tire being conveyed by said first conveying device is to be transferred to said storage yard when the signals of tire type from the tire type identifying device and the tire inspecting information device do not coincide with each other;

a tire delivering operation controller that operates said tire moving mechanism (M) to deliver the tire to the second conveying device when said tire selecting device (87) determines that the tire being conveyed by said first conveying device is to be transferred to said second conveying device; and a storage position determining device that operates in association with said coordinate map storage device to cause said tire moving mechanism to place the tire to a selected location within the storage yard, when said tire selecting device determines that the tire being conveyed by said first conveying device is to be transferred to the storage yard.

5. The tire storage system according claim 4, wherein said reader is a bar code reader.

6. The tire storage system according to claim 4, further comprising a tire storing operation controller responsive to a determination of said storage position determining device to operate said tire moving mechanism.

7. The tire storage system according to claim 4, further comprising an outgoing tire position checking device responsive to the tire inspection signal from said tire inspecting information device to determine positions of tires to be transferred to said second conveying device.

* * * * *